United States Patent
Lenchner et al.

(10) Patent No.: US 11,880,893 B2
(45) Date of Patent: Jan. 23, 2024

(54) ENERGY EFFICIENT ELECTRONIC CARD

(71) Applicant: INTERNATIONAL BUSINESS MACHINES CORPORATION, Armonk, NY (US)

(72) Inventors: Jonathan Lenchner, North Salem, NY (US); Kumar Bhaskaran, Englewood Cliffs, NJ (US); Reha Yurdakul, Istanbul (TR); Toby Kurien, Midrand (ZA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 309 days.

(21) Appl. No.: 16/872,415

(22) Filed: May 12, 2020

(65) Prior Publication Data

US 2021/0358053 A1 Nov. 18, 2021

(51) Int. Cl.
*H04B 5/00* (2006.01)
*G06Q 50/00* (2012.01)
*G06Q 10/10* (2023.01)

(52) U.S. Cl.
CPC .......... *G06Q 50/01* (2013.01); *G06Q 10/10* (2013.01); *H04B 5/0031* (2013.01)

(58) Field of Classification Search
CPC .................................................. G06Q 50/01
(Continued)

(56) References Cited

U.S. PATENT DOCUMENTS 5,493,105 A 2/1996 Desai
7,130,826 B1 10/2006 Lenchner
(Continued)

FOREIGN PATENT DOCUMENTS

CN 202230483 U 5/2012
CN 105101471 A 11/2015
(Continued)

OTHER PUBLICATIONS

Amazon, AgentWhiteUSA Cell Phone Wallet, Stick on Wallet (3 Pieces) (for Credit Card, Business Card & Id) | Compatible with Almost Every Phone | iPhone, Android & Most Smartphones, (https://www.amazon.com/AgentWhiteUSA-Wallet-Business-Android-Smartphones/dp/B06XCXPCTH/ref=pd_lpo_vtph_107_bs_t_1?_encoding=UTF8&psc=1&refRID=T4HFVPV35WXA4V3GRGFE), 8 pages.
(Continued)

*Primary Examiner* — Titus Wong
(74) *Attorney, Agent, or Firm* — Rakesh Roy

(57) ABSTRACT

A method, computer system, and a computer program product for energy efficient data exchange is provided. The present invention may include a first electronic card device (ECD) including a first switch and a second switch. The present invention may include the first switch being configured to power on the first ECD responsive to the first ECD engaging a second ECD. The present invention may include the first ECD being configured to exchange data with the second ECD. The present invention may include a docking component configured to receive the first ECD. The present invention may include the docking component including an actuator configured to engage the second switch to power on the first ECD when the first ECD is received by the docking component. The present invention may include the first ECD configured to transfer received data from the second ECD to a mobile device associated with the docking component.

20 Claims, 8 Drawing Sheets

(58) Field of Classification Search
USPC .......................................................... 710/13
See application file for complete search history.

(56) References Cited

U.S. PATENT DOCUMENTS

| | | | |
|---|---|---|---|
| 8,947,547 B1 | 2/2015 | Millikan | |
| 9,477,938 B1 * | 10/2016 | Russell | G06Q 10/087 |
| 9,621,252 B2 | 4/2017 | Sarda | |
| 9,667,810 B1 | 5/2017 | Brown | |
| 9,760,645 B1 | 9/2017 | Park | |
| 9,922,124 B2 | 3/2018 | Rathod | |
| 9,923,852 B2 | 3/2018 | Smith | |
| 2004/0203381 A1 | 10/2004 | Cahn | |
| 2005/0233784 A1 | 10/2005 | You | |
| 2006/0087426 A1 | 4/2006 | Liang | |
| 2006/0148404 A1 * | 7/2006 | Wakim | G06Q 20/327 |
| | | | 455/406 |
| 2008/0125148 A1 | 5/2008 | Zhao | |
| 2009/0086949 A1 | 4/2009 | Caspi | |
| 2009/0216839 A1 * | 8/2009 | Yokoyama | G06Q 10/10 |
| | | | 713/150 |
| 2011/0070827 A1 * | 3/2011 | Griffin | H04B 5/02 |
| | | | 455/41.1 |
| 2012/0209744 A1 | 8/2012 | Mullen | |
| 2013/0198867 A1 * | 8/2013 | Ricci | G06F 1/1632 |
| | | | 726/29 |
| 2013/0217365 A1 | 8/2013 | Ramnani | |
| 2013/0227037 A1 | 8/2013 | Wayans | |
| 2013/0267171 A1 | 10/2013 | Sarkar | |
| 2013/0311892 A1 * | 11/2013 | Hsieh | G06Q 10/1095 |
| | | | 715/738 |
| 2014/0017999 A1 * | 1/2014 | Brabenac | H04L 65/1093 |
| | | | 455/41.1 |
| 2014/0098073 A1 | 4/2014 | Singh | |
| 2014/0108289 A1 * | 4/2014 | Eitan | G06Q 50/01 |
| | | | 235/375 |
| 2014/0113549 A1 * | 4/2014 | Beg | H04W 4/12 |
| | | | 455/41.1 |
| 2014/0139426 A1 | 5/2014 | Kryze | |
| 2014/0148094 A1 * | 5/2014 | Park | H04B 5/00 |
| | | | 455/41.1 |
| 2014/0254470 A1 * | 9/2014 | Wendling | H04N 21/4627 |
| | | | 370/315 |
| 2014/0263627 A1 | 9/2014 | Wyatt | |
| 2014/0282961 A1 | 9/2014 | Dorfman | |
| 2014/0287723 A1 | 9/2014 | Lafever | |
| 2016/0048709 A1 | 2/2016 | Butler | |
| 2016/0143004 A1 | 5/2016 | Stromberg | |
| 2016/0359525 A1 | 12/2016 | Griffin | |
| 2017/0025896 A1 | 1/2017 | Partovi | |
| 2017/0064433 A1 | 3/2017 | Hirsch | |
| 2017/0127355 A1 | 5/2017 | Song | |
| 2018/0233225 A1 | 8/2018 | Experton | |
| 2020/0120467 A1 | 4/2020 | Lenchner | |

FOREIGN PATENT DOCUMENTS

| | | |
|---|---|---|
| CN | 105610473 A | 5/2016 |
| CN | 205581933 U | 9/2016 |
| CN | 106060768 A | 10/2016 |
| JP | 2014170382 A | 9/2014 |
| WO | 2006000525 A1 | 1/2006 |
| WO | 2015112881 A1 | 7/2015 |

OTHER PUBLICATIONS

Amazon, Cellessentials Card Holder for Back of Phone—Silicone Stick on Cell Phone Wallet with Pocket for Credit Card, ID, Business Card—iPhone, Android and Most Smartphones—3 Pack(Black), (https://www.amazon.com/Cellessentials-Card-Holder-Back-Phone/dp/B01E0563AQ/ref=pd_lpo_vtph_107_tr_t_2?_encoding=UTF8&psc=1&refRID=T4HFVPV35WXA4V3GRGFE), 8 pages.

Maina, A., "10 Apps for Creating a Digital Business Card", Small Business Trends, https://smallbiztrends.com/2017/04/digital-business-card.html, Apr. 6, 2017, Accessed on May 5, 2020, 10 pages.

Mel, et al. "The NIST Definition of Cloud Computing". Recommendations of the National Institute of Standards and Technology. Nov. 16, 2015.

IBM: List of IBM Patents or Patent Applications Treated as Related (Appendix P), May 13, 2020, pp. 1-2.

Lenchner et al., "Integrating Scanned Business Cards With Identification of Meeting Attendees in a Given Seating Arrangement," Application and Drawings, Filed on Jan. 25, 2019, 31 Pages, U.S. Appl. No. 16/257,576.

International Searching Authority, "Notification of Transmittal of the international Search Report and the Written Opinion of the International Searching Authority, or Declaration," Patent Cooperation Treaty, dated Jun. 21, 2021, 9 pages, International Application No. PCT/CN2021/082408.

* cited by examiner

ENERGY EFFICIENT ELECTRONIC CARD

BACKGROUND

The present invention relates generally to the field of computing, and more particularly to portable electronic devices for information exchange.

In a typical conference setting, people may meet and exchange contact information, for example, by exchanging business cards or other identifying information, in manual or electronic manners. While exchanging business cards or the like may allow for making lasting contacts, it may be difficult to recall at a later time which business card to associate with which person, particularly, for example, if business cards were exchanged in a populated environment such as large conferences, where the meeting among the people only lasted for a short duration. As another example, in such large conference settings, it may be not possible to meet and exchange business cards with everyone, or everyone one would ideally like to meet, in the first place.

SUMMARY

Embodiments of the present invention disclose a computer system for energy efficient data exchange. The present invention may include a first electronic card device (ECD) including a first switch and a second switch. The present invention may include the first switch being configured to power on the first ECD responsive to the first ECD engaging a second ECD. The present invention may include the first ECD being configured to exchange data with the second ECD. The present invention may include a docking component configured to receive the first ECD. The present invention may include the docking component including an actuator configured to engage the second switch to power on the first ECD responsive to the first ECD being received by the docking component. The present invention may include the first ECD being configured to transfer received data from the second ECD to a mobile device associated with the docking component.

Embodiments of the present invention further disclose a method and a computer program product for energy efficient data exchange. The present invention may include detecting an activation of a first switch to power on the first electronic card device (ECD). The present invention may include determining that a second ECD is within a threshold proximity of the first ECD responsive to the detected activation of the first switch. The present invention may include transmitting an accumulated information from the first ECD to a mobile device responsive to determining that the first ECD is docked. The present invention may include storing the accumulated information in the first ECD responsive to determining that the first ECD is not docked. The present invention may include detecting a deactivation of the first switch to power off the first ECD, responsive to the second ECD being outside of the threshold proximity of the first ECD.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
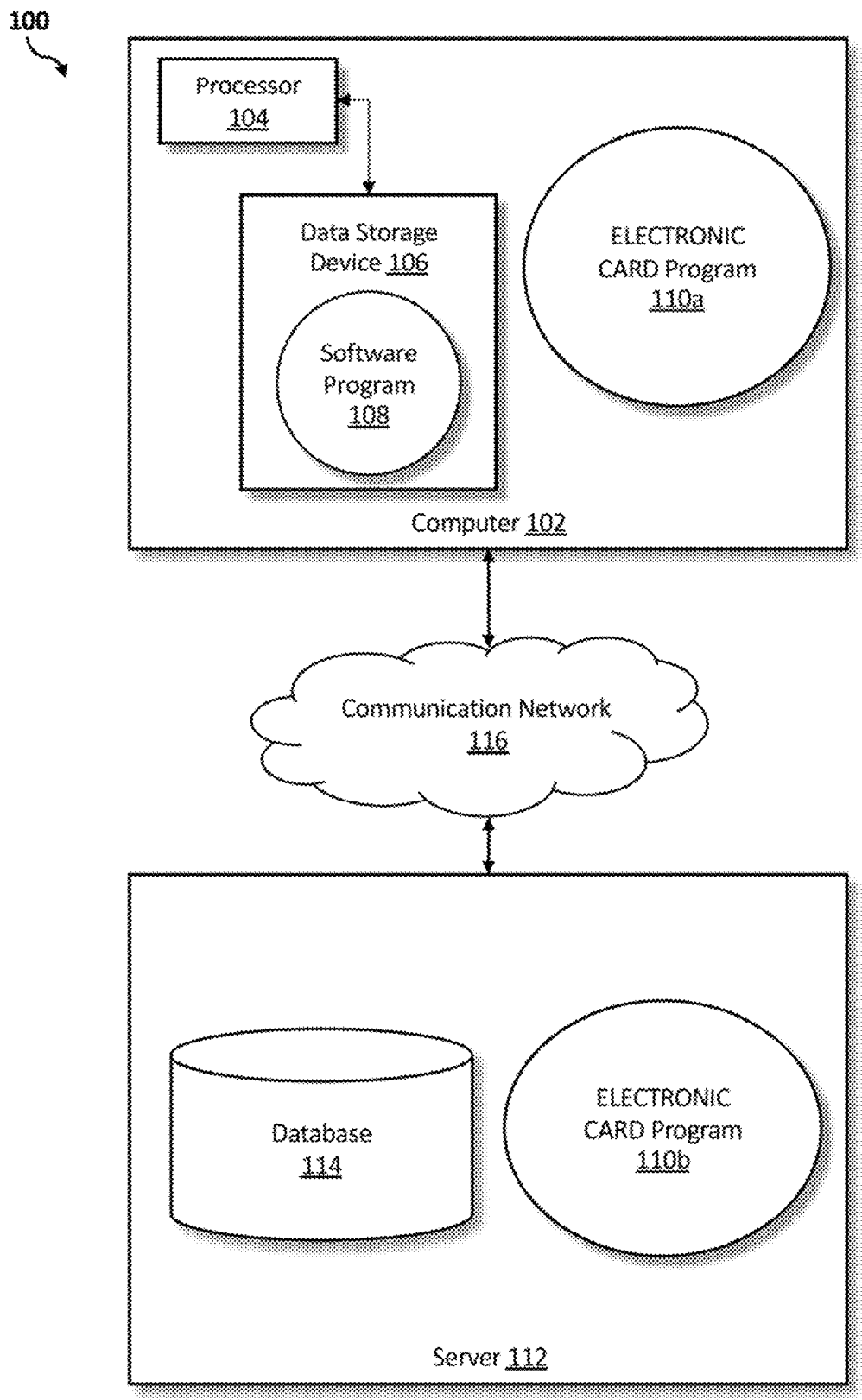
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for exchanging data using a portable, energy efficient electronic device. As such, the present embodiment has the capacity to improve the technical field of portable electronic devices for exchanging information, by providing for a self-contained electronic card device and a card holder (e.g., smartphone or other mobile device-based card holder) configured to minimize power consumption by the electronic card device and facilitate convenient storage thereof. More specifically, the card holder may include a magnet which may engage with a magnet on the electronic card device, when the electronic card device is docked (e.g., attached, placed, inserted) in the card holder. If the electronic card device knows that it is attached to a user's smartphone (e.g., docked in the card holder attached to back of the user's smartphone), the electronic card device may automatically transfer one or more stored information to the user's smartphone. If the electronic card device knows that it is not attached to a user's smartphone (e.g., not docked in the card holder attached to back of the user's smartphone), the electronic card device may continue to store the information until the electronic card device comes in contact with the user's smartphone.

As described previously, in a typical conference setting, people may meet and exchange contact information, for example, by exchanging business cards or other identifying information, in manual or electronic manners. While exchanging business cards or the like may allow for making lasting contacts, it may be difficult to recall at a later time which business card to associate with which person, particularly, for example, if business cards were exchanged in a populated environment such as large conferences, where the meeting among the people only lasted for a short duration. As another example, in such large conference settings, it may be not possible to meet and exchange business cards with everyone, or everyone one would ideally like to meet, in the first place.

Therefore, it may be advantageous to, among other things, provide a way to exchange information using an electronic card device (ECD). It may also be advantageous to provide a way to determine the presence of the ECD in the card holder (e.g., smartphone-based holder) and transfer information from the ECD to the user's smartphone after making that determination. It may further be advantageous to provide a way to conveniently store the electronic card device with the user's smartphone.

According to at least one embodiment, the ECD may also be referred to, for example, as an electronic business card device, business card device, card device, card, or device. The ECD may be equipped with two magnets and two reed switches arranged in (magnet, reed switch) pairs. One magnet-reed pair may be configured to engage power when the ECD is in the presence of another ECD (e.g., a partner electronic business card), enabling the exchange of contact and potentially other information. Another magnet-reed pair may be configured to engage power when the ECD is docked in the card holder. The first and second reed switches may be arranged in parallel.

According to one embodiment, when the ECD is placed in the card holder on a user's smartphone, a second reed switch resident on the ECD, independent of the first reed switch may be engaged to power on the ECD. Then, the ECD may exchange information contained on the ECD with the smartphone if the information is available. In addition, the ECD may register, in the device memory, an indication that the ECD is attached to the smartphone (e.g., docked in the card holder). Once this information is exchanged and/or registered with the ECD, the ECD may be automatically powered off through software. Next, when the ECD comes in contact with another ECD, the first reed switch may be engaged, and the ECDs may exchange information. Again, once the information is exchanged and/or registered with the ECD, the ECD may be automatically powered off through software. Thereafter, if the ECD knows that it is attached to the user's smartphone, the ECD may immediately transfer the accumulated information to the user's smartphone. If the ECD knows that it is not attached to the user's smartphone, the accumulated information may be stored for when the ECD comes in contact with the smartphone.

According to at least one embodiment, users may choose to only exchange information with a phone, when the ECD is "docked" or any time a near-field communication (NFC) signal is detected. It is contemplated that the only-when-docked option may be more energy efficient. NFC may be preferred to Bluetooth® (Bluetooth and all Bluetooth—based trademarks and logos are trademarks or registered trademarks of Bluetooth SIG, Inc. and/or its affiliates) because of NFC's lower power consumption and lack of a formal pairing requirement.

According to one embodiment, a user may avoid accidentally transmitting information from the user's ECD to someone else's phone or another NFC device other than the phone with which the ECD is docked (e.g., because a nearby NFC signal may be received), by first connecting with the ECD in a secure area, far from other NFC devices. Upon this first docking "handshake" the user's phone may identify itself by exchanging a unique number/token with the ECD. Thereafter, when sending information, the electronic card device may use the token to encrypt the information being sent to the user's phone.

According to one embodiment, upon determining the presence of the ECD in the card holder, the ECD may store in its memory, a record of being docked with the smartphone. When released from the card holder, this record may be updated to reflect that the ECD is no longer next to the smartphone or docked.

According to one embodiment, if contact information has been stored by the ECD as a result of card to card interaction and the ECD is in the holder, the information may be transferred to the user's smartphone via NFC, Bluetooth, or any other proximity-based communication mechanism. Upon completion of the needed transactions, the ECD may automatically powers itself off. It is contemplated the disclosed ECD may only need to be charged approximately once per year, even if used consistently, as result of the present disclosure.

In some embodiments, the electronic information shared may include basic contact information. Other information such as a photograph, areas of interest and matching criterion or criteria may also be shared. In some embodiments, a computer-implemented agent may filter or negotiate sharing or exchanging of information based on one or more criteria. Examples of criteria may include, but are not limited to, areas or subjects of interest, job title or role, an individual with one or more specific specialties (for example, technical specialty), or others. The computer-implemented agent may be resident and running on the ECD. In another aspect, the computer-implemented agent may be running on a remote computer system, for example, in a cloud computing environment, communicating with the ECD, and acting on behalf of the ECD. In some embodiments, exchanging information such as a phone number may require a negotiation or permissions.

In some embodiments, when information is shared with a fellow meeting participant or attendee, and the fellow meeting participant or attendee in turn exchanges information with someone else via their ECD, and that someone else has sufficient overlapping interests as specified by the matching criteria or criterion, the information about this new person may be sent to the original person, for instance, with a permission from the new person to disseminate the information. Such permission or authorization may be specified and included as part of the criteria. If this new person meets additional people with enough overlapping interests that exceed the first person's matching criteria, such a person's contact information and interests with the permission of the person, may be relayed to the first person, and so on. In this way any party to a meeting or conference nay effectively meet everyone in the meeting or conference with matching interests beyond a prescribed threshold. The virtually met individuals may then be prioritized for follow up based on the number or amount of the prescribed matching conditions.

In some embodiments, the matching criteria need not be symmetrical. For instance, one ECD may store extremely strict matching criteria (e.g., specifically, or narrowly prescribed interests such as specific areas of technology) associated with a party, while a second ECD associated with another meeting attendee may store general broad interest criteria, which may include virtually meeting any participant or attendee. In some embodiments, the person giving up information may only be willing to give up their information if the overlap in interests exceeds their own threshold rather than just that threshold of the receiver. In other cases, meeting goers may wish not to exchange their information unless they have personally met a given individual. Thus, respective ECDs may store and function according to different criteria associated with particular users. The ECD and method thereof may support all such users' criteria and their exchange of information requirements. Additionally, a given individual's criteria (thus criteria associated with the ECD associated with that individual) may specify that the individual information be given in exchange of a micropayment, for example to avoid bulk advertising.

In some embodiments, a business card device or ECD may include a processor, a memory, and a power source such as a battery. A self-contained ECD may start by detecting the addition of a new near field device and may immediately begin a sequential exchange of information. In some embodiments, a user may not need to take the device out of a pocket or a bag for this exchange to take place.

In some embodiments, to avoid accidentally collecting contacts via proximity, the ECD may be implemented with a button or other actuator to initiate contact exchange. The ECD may also be implemented with a sensor to detect a motion such as shaking of the ECD, in order to initiate contact exchange. For instance, a user may shake the ECD to wake it up (and in the process potentially impart power to the ECD). Yet in another aspect, the ECD may be implemented to detect tapping and/or being within a few millimeters of one another, and in response initiate contact exchange. In various embodiments, the device may synchronize with a user's smartphone via a wireless technology (e.g., NFC, Bluetooth).

In another embodiment, ECDs may be implemented to exchange tokens. The tokens may then be communicated to or returned to another computer or system, which may act on the tokens, for example, to send contact information associated with the tokens to a device associated with the user of the ECD. For example, business ECDs may be distributed to users attending a conference, and implemented to exchange tokens. In one aspect, the ECDs may be implemented to exchange tokens within a defined perimeter where the conference is taking place. When the ECDs are returned to the registration desk of the conference, a reader device may download the collected tokens, cross-reference the tokens with the registration database, and then send the collected contacts, as well as other contacts matching the user's criterion or criteria, to the user. In one aspect, this final transfer may occur via electronic mail (E-mail), short message service (SMS), an app, or another service or method.

In embodiments of the present disclosure, the ECD may include one or more power sources, such as, for example, a lithium-ion battery. The ECD may be encoded with program instructions to exchange information and/or tokens. The ECD may be equipped with a sensor that can detect proximity of another such ECD. The card may electronically transfer contact information and may also transfer other biographical information upon close contact with another ECD. The degree of information details being exchanged may be negotiated between the cards, e.g., based on one or more criteria stored by the ECD or retrieved by the ECD. In one aspect, a greater amount of contact information may be exchanged based on a degree of similarity of interests discovered of the users of the ECDs. A processor on the ECD may run a computer-implemented agent, which may communicate with a neutral third party agent (e.g., running on a remote computer system), providing information associated with a user of the ECD to the neutral third party agent. The neutral third party agent may determine the degree or level of commonality between the first ECD and another ECD or device in proximity, and report back the degree of commonality to the agent running on the ECD or on behalf of the ECD. Based on the level of commonality, the agent of the ECD may determine what information to share and provides the information to the neutral third party agent. The neutral third party agent may then communicate the shared information to another ECD or device in proximity. As described above, in another aspect, the computer-implemented agent may reside and run remotely on behalf of the ECD and communicate with the processor of the ECD. Yet in another aspect, direct negotiation for sharing of information may be performed between computer-implements agents of respective ECDs, for example, without a third party agent.

According to one embodiment, electronically transferring contact and biographical information may allow for the contacts of one party to be shared with another party based on consent of those parties and further agent based negotiations establishing common interests. In one aspect, providing information may be done in return for a payment.

In one aspect, contact information contained on or linked to the physical ECD may be uploaded, for example, using a wireless technology standard such as NFC or Bluetooth (to a paired smartphone or like device), responsive to establishing proximity of the two devices. In another aspect, contact information contained on the physical business card-like device may be uploaded to another device on an as-needed basis, for instance, via a wireless communications or another communication method.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an electronic card program 110a. The networked computer environment 100 may also include a server 112 that is enabled to run an electronic card program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 6, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the electronic card program 110a, 110b may interact with a database 114 that may be embedded in various storage devices, such as, but not limited to a computer/mobile device 102, a networked server 112, or a cloud storage service.

Figure 2:
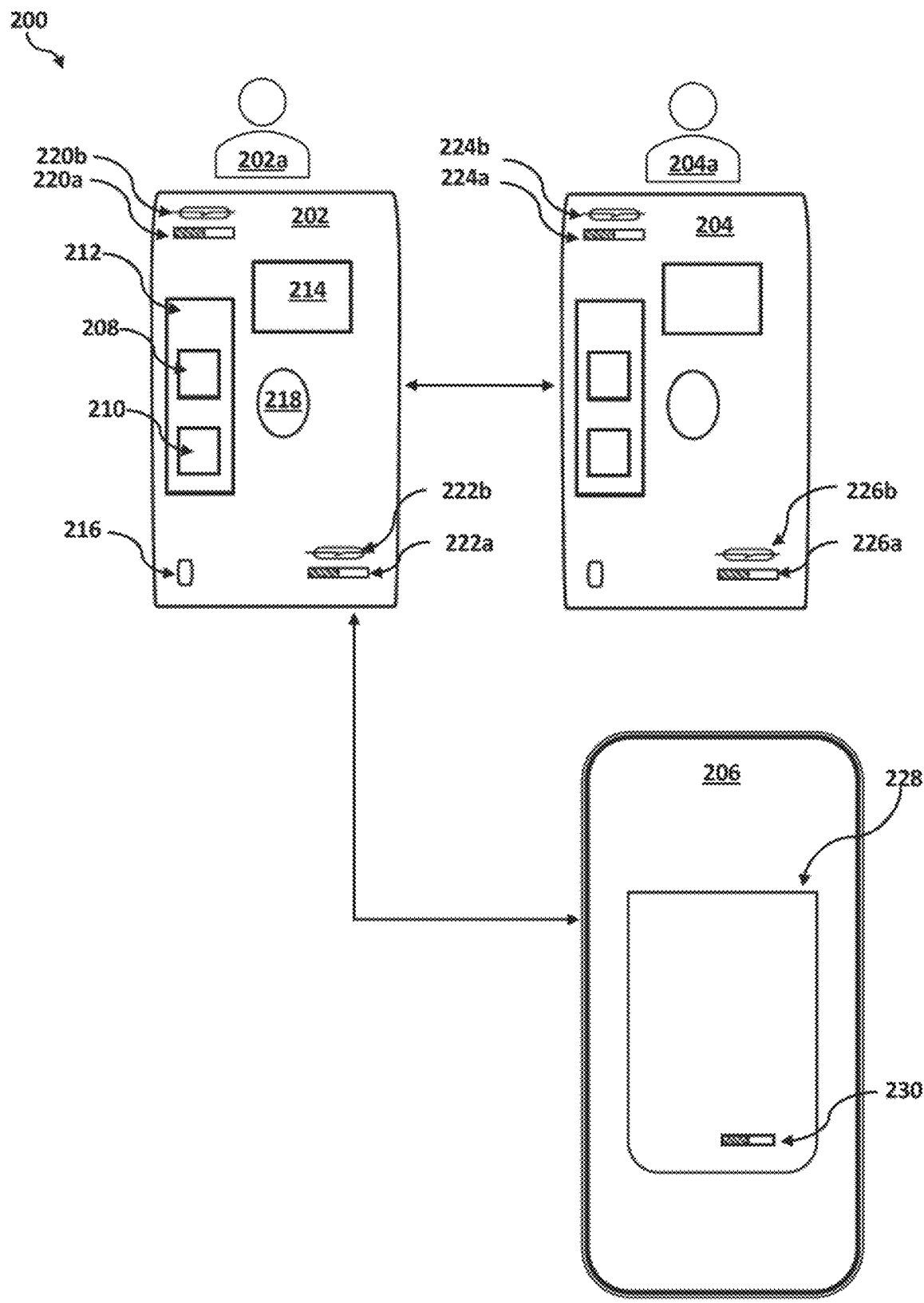
FIG. 2 is a block diagram of an electronic card system according to at least one embodiment.

Referring now to FIG. 2, a block diagram illustrating an exemplary electronic card system 200 according to at least one embodiment is depicted. In one embodiment, the electronic card system 200 may be implemented in a networked computer environment, similar to the networked computer environment 100 described with reference to FIG. 1.

The electronic card system 200 may include an apparatus such as, an electronic card device (ECD) 202 having a shape of a physical business card (or smart card or pocket-sized card or like sized card). In one embodiment, a first ECD 202 in the electronic card system 200 may be in proximity with another device, such as, a second ECD 204 (e.g., partner ECD), or a smartphone 206 (or similar mobile device, such as, for example, a tablet or a laptop)). Responsive to the devices, for example, the ECD 202 and partner ECD 204, being in a threshold proximity (e.g., in the range of a few millimeters to approximately 25 centimeters) detectable by sensors on the respective devices (202, 204), the ECD 202 may pair with the partner ECD 204, and begin exchanging data wirelessly. For example, the ECD 202 may receive data, such as, for example, contact information associated with a user 204a of the partner ECD 204 and transmit to the partner ECD 204, contact information associated with a user 202a of the ECD 202. In another aspect, a token with an identifier associated with the user 204a of the partner ECD 204 may be received and the token may be converted to contact information by another device, for example, by a computer system reading the token and extracting from a database the contact information associated with the token. The computer system may reside in the cloud, on another remote computer, or on the ECDs 202, 204.

According to one embodiment, wireless technology such as NFC may enable communication among the devices 202, 204, 206, for example, when at least two of such devices are within sufficient proximity. In at least some embodiments, various other wireless technologies may be used alternatively or additionally, such as, Bluetooth, standard Wi-Fi as specified by the IEEE 802.11 protocol, and others. Such wireless technology may allow for pairing of the devices, for example, ECDs 202, 204 and exchanging of information.

According to one embodiment, ECD 202 and partner ECD 204 may include one or more of the components which will be detailed further with reference to ECD 202. In one embodiment, ECD 202, may include one or more information 210 stored in a memory 212. The information 210 may include contact information, other biographical information, and/or a photograph corresponding to the user 202a, which the user 202a may want to exchange with others (e.g., user 204a in a conference setting). In one embodiment, information 210 may be preloaded onto the ECD 202, for exchanging with one or more other devices (e.g., partner ECD 204). In another embodiment, the memory 212 may include a token 208 with a specific identifier associated with the ECD 202. The token 208 may be associated with or linked with a record in a remote (e.g., cloud-resident) database storing information (e.g., contact information, other biographical information, and/or a photograph) of the user 202a.

In one aspect, ECD 202 may include a smart card embedded with a microchip or integrated circuit (IC) 214. In at least one embodiment, ECD 202 may include a microprocessor executing the electronic card program 110a, 110b (shown in FIG. 1). The electronic card program 110a, 110b may include a single computer program or multiple program modules or sets of instructions being executed by one or more processors of the networked computer environment. The electronic card program 110a, 110b may be practiced in distributed cloud computing environments where tasks may be performed by remote processing devices which may be linked through a communication network (e.g., communication network 116). In one embodiment, the electronic card program 110a, 110b may include program instructions which may be collectively stored on one or more computer-readable storage media, such as, for example, memory 212 or other storage devices (e.g., storage device 106 and database 114 shown in FIG. 1). The electronic card program 110a, 110b may include routines, objects, components, units, logic, data structures, and actions that may perform particular tasks or implement particular abstract data types.

According to one embodiment, the electronic card program 110a, 110b may be executed to function as an agent for negotiating an exchange of information between ECD 202 and the partner ECD 204. For instance, the electronic card program 110a, 110b (e.g., agent component) executing on a microprocessor may determine whether information such as interests of the user 202a of the ECD 202 intersect with information such as interests of the user 204a of the partner ECD 204 or the like. Responsive to determining that a threshold level of interests intersect, the electronic card program 110a, 110b may be executed to exchange contact information between the ECD 202 and the partner ECD 204. The interests of the respective users 202a, 204a may be stored in the respective ECDs 202, 204 and/or downloaded from a computer system storing a database of such information.

In one embodiment, the electronic card program 110a, 110b may incorporate a current context when negotiating the exchange of information. The current context, for example, may include a criterion that specifies that an interest of the user 202a of the ECD 202 match with an interest of the user 204a of the partner ECD 204. The current context, for example, may also include the current meeting setting such as a conference or meeting, for example, attended by individuals associated with the ECDs. The ECD 202 may verifiably establish that an individual associated with the partner ECD 204 is a participant in that meeting or conference, e.g., by querying a database of participants in the meeting, by obtaining or receiving an electronic signal from a badge associated with that meeting, or by other methods. In one example, only the participants or attendees of a conference or meeting may be given such ECDs, and therefore, by virtue of coming in contact with another such ECD, may automatically determine that an individual is a fellow meeting or conference attendee.

In one embodiment, ECD 202 may be configured or programmed to communicate with the smartphone 206 to upload information accumulated in the ECD 202 (e.g., received from partner ECD 204) to the smartphone 206.

In one embodiment, ECD 202 may include a light emitting diode (LED) 216 configured for status indication. In one embodiment, the LED 216 may light up upon the beginning of the negotiation (e.g., responsive to the negotiation being initiated) between ECD 202 and the partner ECD 204. In one embodiment, the LED 216 may turn off after a failed negotiation or after the exchange of information is completed (e.g., end of negotiation) between ECD 202 and the partner ECD 204. Different LED light shading may be employed in various embodiments. For example, LED 216 may be configured to turn yellow at the inception of contact and during negotiation between ECD 202 and the partner ECD 204. Then, LED 216 may be configured to briefly turn green once the negotiation is determined to have been successful or briefly turn red if the negotiation is determined to have failed. In other embodiments, different light shadings may be employed by LED 216. In another aspect, ECD 202 may be configured to vibrate upon the beginning of the negotiation and configured to cease vibrating after a failed negotiation or after the exchange of information is completed.

According to one embodiment, the electronic card program 110*a*, 110*b* may be executed to control the power cycle (e.g., powering on/off) of the ECD 202 to minimize the energy requirements of a battery 218 of the ECD 202, as will be further detailed below.

In one embodiment, the ECD 202 may be initially (e.g., by default) powered off completely. In one embodiment, the ECD 202 may be powered off when it disengages from the partner ECD 204 and prior to being docked with the smartphone 206, as will be further detailed below. In at least one embodiment, the ECD 202 may be powered on by engaging the partner ECD 204. In various embodiments, the ECD 202 may be powered on by docking with the smartphone 206, as will be further detailed below. In one embodiment, the electronic card program 110*a*, 110*b* may have two different startup scripts based on whether the ECD 202 is being powered on from contact with the partner ECD 204 or from contact with the smartphone 206. In another embodiment, the electronic card program 110*a*, 110*b* may have one startup script including a parameter indicating whether the ECD 202 is being powered on from contact with the partner ECD 204 or from contact with the smartphone 206. Alternatively, the electronic card program 110*a*, 110*b* may have one startup script and implement proximity-based communication mechanisms (e.g., NFC, Bluetooth) to determine whether the ECD 202 is connected to the partner ECD 204 or the smartphone 206.

In at least one embodiment, the ECD 202 may be automatically powered off in response to physically disengaging from the partner ECD 204 and/or the smartphone 206, as will be further detailed below. In various embodiments, the ECD 202 may be powered off with the smartphone 206 via a setting on a companion app component of the electronic card program 110*a*, 110*b* running on the smartphone 206.

In one aspect, the powering on and off of the ECDs 202, 204 may be achieved by interlocking magnets of the ECDs and accompanying reed devices. In one aspect, the powering on and off of the ECDs 202, 204 may be achieved by a physical mechanical switch.

ECD 202 may include two magnets (first magnet 220*a* and second magnet 222*a*) and two switch devices (first switch device 220*b* and second switch device 222*b*). In various embodiments, the switch devices 220*b*, 222*b* may include one or more reed relays and/or reed switches. In at least some embodiments, the two switch devices 220*b*, 222*b* may also include mechanical switches. Accordingly, embodiments of the disclosure may use the term "switch" to include reed relays, reed switches, and/or mechanical switches. In one embodiment, the two magnets and two switch devices may be arranged in magnet-switch pairs, where the first magnet 220*a* and first switch device 220*b* may provide a first magnet-switch pair and the second magnet 222*a* and the second switch device 222*b* may provide a second magnet-switch pair. According to one embodiment, the first and second switch devices 220*b*, 220*b* may be arranged in parallel and provide two paths for completing a circuit (e.g., via turning on a mechanical switch or engaging a reed switch or relay) configured to power on or activate the ECD 202.

The partner ECD 204 may similarly include a first magnet 224*a* and first switch device 224*b* arranged in a first magnet-switch pair and a second magnet 226*a* and a second switch device 226*b* arranged in a second magnet-switch pair.

According to one embodiment, when the first switch device 220*b* of the ECD 202 and the first switch device 224*b* of the partner ECD 204 are mechanical switches, magnets may not be necessary. In such embodiments, the first mechanical switch (e.g., first switch device 220*b*) of the ECD 202 and the first mechanical switch (e.g., first switch device 224*b*) of the partner ECD 204 may be pressed together in opposite orientations to complete the respective circuit paths and power on the respective ECDs.

In one embodiment, the first magnet-switch pair (e.g., first magnet 220*a*, first switch device 220*b*) of ECD 202 may engage the first magnet-switch pair (e.g., first magnet 224*a*, first switch device 224*b*) of the partner ECD 204 such that interactions between the first magnet 220*a* of ECD 202 and the first magnet 224*a* of the partner ECD 204 may actuate the first switch devices 220*b*, 224*b* of the ECDs 202, 204, respectively. Accordingly, the first magnets 220*a*, 224*a* on the respective ECDs 202, 204 may activate the accompanying switch devices 220*b*, 224*b* to close a first circuit path (operatively coupled to the switch devices) and power on the respective ECDs 202, 204. In one embodiment, the first magnet-switch pair of the ECD 202 may be configured to disengage from the corresponding first magnet-switch pair of the partner ECD 204 to power off the ECD 202. The switch devices 220*b*, 224*b* may spring back to the off position so that the switch devices 220*b*, 224*b* may be reengaged again responsive to contact between the ECD 202 and partner ECD 204.

According to other embodiments, when the first switch device 220*b* of the ECD 202 and the first switch device 224*b* of the partner ECD 204 are mechanical switches, magnets may be paired with mechanical switches (e.g., magnet-mechanical switch pair). In such embodiments, interactions between the first magnet 220*a* of ECD 202 and the first magnet 224*a* of the partner ECD 204 may activate the first mechanical switches of the ECDs 202, 204, respectively to complete the respective circuit paths and power on the respective ECDs.

In at least one embodiment, the smartphone 206 of the first user 202*a* may include a docking component, such as, a holder 228. In one embodiment, the holder 228 may be configured to receive the ECD 202 for storage and portability. ECD 202 may be docked with the smartphone 206 in the holder 228 and configured to transfer or exchange data stored in the ECD 202 (e.g., data received from the partner ECD) with the smartphone 206. In one embodiment, the holder 226 may be removably attached to the smartphone 206. In one embodiment, the holder 228 may include an actuator, such as, a third magnet 230 which may interact with the second magnet 222*a* of ECD 202, when the ECD 202 is received by (e.g., placed or docked in) the holder 228. The interaction between the third magnet 230 of the holder 228 and the second magnet 222*a* of the ECD 202 may activate the second switch device 222*b* of the ECD 202 to close a second circuit path (operatively coupled to the switch device) configured to power on the ECD 202.

According to one embodiment, when the second switch device 222*b* of the ECD 202 is a second mechanical switch, the second magnet 222*a* of ECD 202 is optional. In such embodiments, the third magnet 230 of the holder 228 may be configured to actuate the second mechanical switch to close the second circuit path (operatively coupled to the mechanical switch) configured to power on the ECD 202. According to another embodiment, the holder 228 may include a mechanical actuator configured to engage (e.g., press) the second mechanical switch to close the second circuit path configured to power on the ECD 202. According to at least one embodiment, the actuator in the holder 228 may include a third mechanical switch. In such embodiments, interactions (e.g., pressed together) between the second mechanical switch of the ECD 202 and the third mechanical switch of the holder 228 in opposite orientations may activate the second switch device 222b of the ECD 202 to close a second circuit path configured to power on the ECD 202. Further, activating the third mechanical switch may alert the docking component to communications from the ECD 202 such that the docking component may devote more cycles to NFC or Bluetooth.

When ECD 202 is placed or docked in the holder 228, the second switch device 222b included in the ECD 202 may be engaged to power on the ECD 202, independent of the first switch device 220b. The second switch device 222b may be activated responsive to the interaction between the third magnet 230 of the holder 228 and the second magnet 222a of the ECD 202. Once ECD 202 is docked in the holder 228 and powered on, the electronic card program 110a, 110b may exchange information 210 with the smartphone 206, if new information is available. In one embodiment, the electronic card program 110a, 110b may register a docked status in the memory 212 of ECD 202. In various embodiments, once information exchange is completed between the ECD 202 and smartphone 206 and/or the docked status is registered in the memory 212, the electronic card program 110a, 110b may implement a script to power off the ECD 202. According to one embodiment, if the ECD 202 comes in contact with the partner ECD 204, the first switch device 220b may be engaged to power on the ECD 202, as described previously. Next, the electronic card program 110a, 110b may be executed to exchange information 210 between the ECDs 202, 204. Thereafter, if the electronic card program 110a, 110b determines that the ECD 202 is docked with the smartphone 206, the electronic card program 110a, 110b may transmit the received information to the smartphone 206. If not, the electronic card program 110a, 110b may store the received information in memory 212 until the ECD 202 comes in contact with the smartphone 206.

According to one embodiment, the electronic card program 110a, 110b may determine whether the ECD 202 is docked with the smartphone 206 by checking for the docked status in the memory 212. In another embodiment, the electronic card program 110a, 110b may implement NFC or other communication methods (e.g., Bluetooth) to determine if the ECD 202 is sufficiently close to the smartphone 206 for transmitting information to the smartphone 206.

According to at least one embodiment, the electronic card program 110a, 110b may enable the user 202a to select a first option (e.g., in companion application running on the smartphone 206) associated with exchanging information with the smartphone 206 only when the ECD 202 is docked in the holder 228. The electronic card program 110a, 110b may also provide a second option associated with exchanging information with the smartphone 206 any time the NFC signal is detected from the smartphone 206 (e.g., when ECD 202 is sufficiently close to the smartphone 206 but not docked in the holder 228). It is contemplated that selecting the first option (e.g., only-when-docked option) may be more energy efficient for ECD 202 than selecting the second option (e.g., NFC-signal-detected option).

According to one embodiment, the electronic card program 110a, 110b may implement NFC to conduct wireless communication between the ECD 202 and smartphone 206. NFC may be preferred relative to Bluetooth due to NFC's lower power consumption of the battery 218 and a lack of formal pairing requirement between the ECD 202 and smartphone 206. When the user 202a first connects the ECD 202 to the smartphone 206, the smartphone 206 may exchange a unique number or identifying token with the ECD 202. After this first handshake operation, when sending information to the smartphone 206, the ECD 202 may use the unique number or identifying token to encrypt the information being send to the smartphone 206. In one embodiment, the user 202a may perform the first handshake operation in a secure area, far from any other NFC devices, to ensure that the unique number or identifying token received by the ECD 202 is from the smartphone 206.

As a result of the first handshake operation and encryption of the information using the unique number or identifying token of the smartphone 206, the problem of unintentionally transmitting information (e.g., contact information) to another user's smartphone (e.g., because a nearby NFC signal may be received), rather than smartphone 206 of the user 202a, may be avoided.

In some embodiments, the ECD 202 may include a physical switch configured to enable the user 202a to power on/off the ECD 202 manually. For instance, if the user 202a does not have the holder 228 attached to the smartphone 206, the user 202a may use the physical switch to manually power on the ECD 202 when in close proximity to the smartphone 206 for exchanging information. Thereafter, the user 202a may use the physical switch to power off the ECD 202.

In yet another embodiment, the ECD 202 may be powered on by default and control of the functions for powering off and docking with the smartphone 206 may be provided via a setting on the companion application running on the smartphone 206. In such embodiments, the ECD 202 may be updated with the latest settings change via NFC the next time the ECD 202 connected with the smartphone 206 (e.g., via docking).

In another embodiment, the ECD 202 may be powered off until a first encounter with the partner ECD 204, when the ECD 202 is powered on by activating the first switch device 220b. Thereafter, the ECD 202 may remain powered on (e.g., even after losing contact with the partner ECD 204) until the ECD 202 uploads the accumulated information onto the smartphone 206. Thereafter, the electronic card program 110a, 110b may power off the ECD 202 via software. Thus, the ECD 202 may be powered off until it captures new information for the first time from another ECD (e.g., partner ECD 204), after which the ECD 202 may remain powered on until the accumulated information is uploaded to the paired smartphone 206.

According to the present embodiment, a user using a client computer 102 or a server computer 112 may use the electronic card program 110a, 110b (respectively) to exchange information using a portable, energy efficient electronic device (e.g., ECD 202) with another user. The electronic card method is explained in more detail below with respect to FIG. 2 (detailed above) and FIGS. 3 to 5 (detailed below).

According to one embodiment, the electronic card method may generally include connecting a first ECD to another second ECD (e.g., partner ECD). Then, the electronic card method may include the ECD powering on via a first switch device (e.g., first reed switch/relay) responsive to interactions between respective first magnets of the first ECD and the second ECD. Next, the electronic card method may include exchanging information with the second ECD via NFC or other wireless communication protocols. Thereafter, the electronic card method may include determining if the first ECD is docked with a mobile device. If the electronic card method determines that the first ECD is docked with the mobile device, the electronic card method may include exchanging information with the mobile device (e.g., uploading accumulated information from the first ECD to the mobile device) via NFC or other wireless communication protocols. If the electronic card method determines that the first ECD is not docked with the mobile device, the electronic card method may include the first ECD powering off either via loss of contact with the second ECD (deactivation of first switch device) or via software instructions to power off following the information exchange with the second ECD.

In at least one embodiment, the electronic card method may include the first ECD docking with the mobile device after one or more exchanges of information between the ECD and other second ECDs. Then, the electronic card method may include the first ECD powering on via a second switch device (e.g., second reed switch/relay) responsive to interactions between a second magnet of the first ECD and a third magnet of a card or ECD holder attached to the mobile device of the user. Once docked with the mobile device, the electronic card method may include the first ECD exchanging information with the mobile device via NFC or other wireless communication protocols. Thereafter, the electronic card method may include the first ECD powering off via software instructions to power off following the information exchange with the mobile device.

Figure 3:
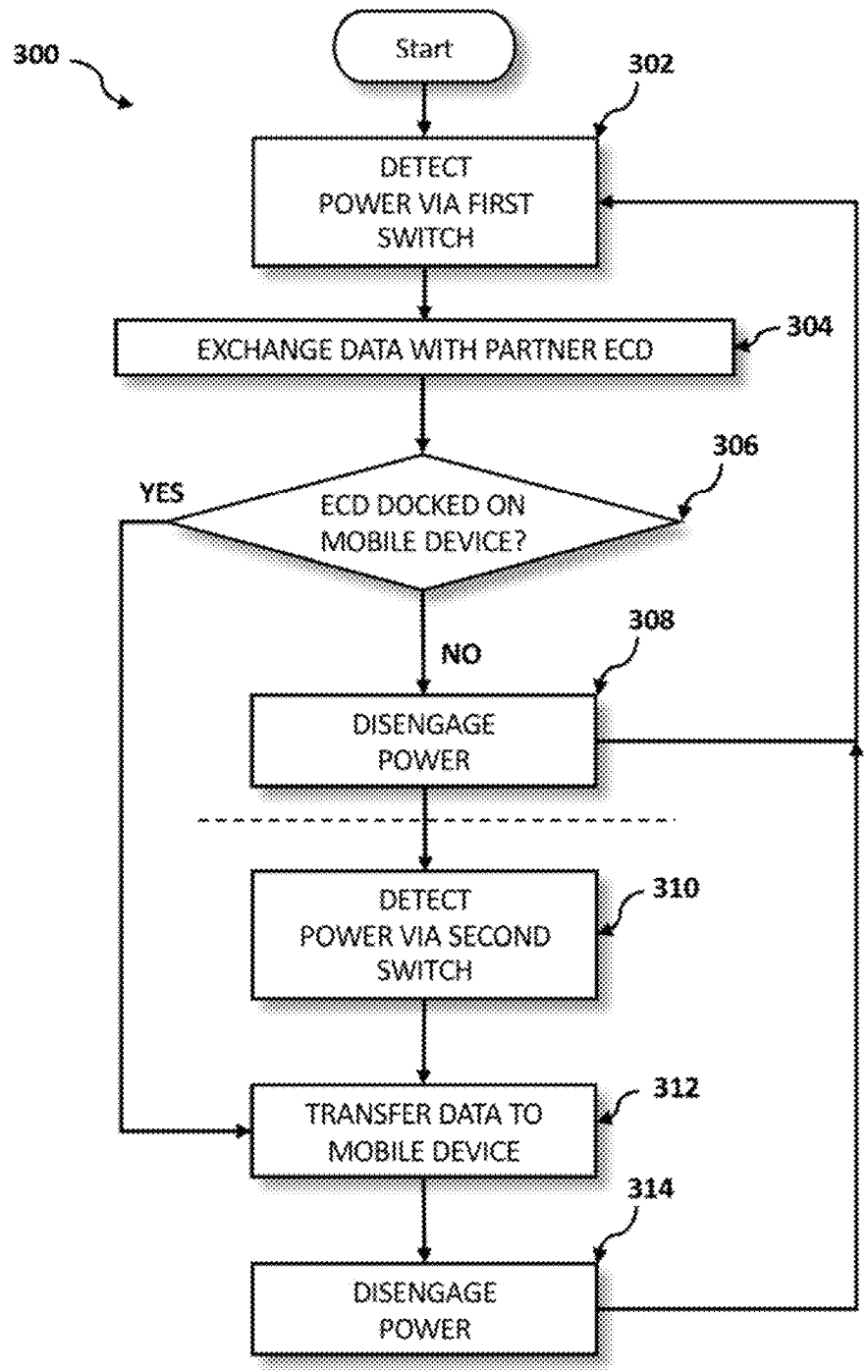
FIG. 3 is an operational flowchart illustrating an energy efficient data exchange process according to at least one embodiment.

Referring now to FIG. 3, an operational flowchart illustrating an exemplary energy efficient data exchange process 300 used by the electronic card program 110a and 110b, as described in connection to FIG. 2, according to at least one embodiment is depicted.

At 302, power is detected via a first switch device. According to one embodiment, a first ECD (e.g., ECD 202) may come into contact with another, second ECD (e.g., partner ECD 204) for exchanging information stored on the respective ECDs. The electronic card program 110a, 110b may detect, in the first ECD, an activation of the first switch device (e.g., switch or relay) to power on the first ECD.

As previously described with reference to FIG. 2, the ECD may include two magnets and two switch devices arranged in magnet-switch pairs, where the first magnet and the first switch device may provide a first magnet-switch pair and the second magnet and the second switch device may provide a second magnet-switch pair. According to one embodiment, the first and second switch devices may be arranged in parallel and provide two paths for completing a circuit (e.g., via physically turning on a switch or engaging a switch relay) configured to power on or activate the ECD. In one embodiment, the first magnet-switch pair of the ECD may engage the first magnet-switch pair of the partner ECD such that interactions between the first magnets on the respective ECDs may activate the accompanying first switch devices to close a first circuit path and power on the respective ECDs. The electronic card program 110a, 110b may determine that the second ECD is within a threshold proximity of the first ECD responsive to detecting the activation of the first switch device. In one embodiment, the first ECD and the second ECD may snap together responsive to the first magnet of the first ECD interlocking with the corresponding first magnet of the second ECD.

Then at 304, data is exchanged with the partner ECD. The first ECD may initiate communication responsive to the first magnet-switch pair of the first ECD engaging the corresponding first magnet-switch pair of the second or partner ECD to power on the first ECD. The memory of the ECD may be loaded with information associated with a user of the ECD. In one embodiment, the electronic card program 110a, 110b executing on the microprocessor of the ECD may negotiate the exchanging of data with the partner ECD based on a current context, as previously described with reference to FIG. 2. The exchangeable data, for example, may include contact information, biographical information and/or a photograph, and/or other information. In another aspect, the information loadable onto the memory may include a token, where the token may be linked to a record in a database storing information such as the contact information, biographical information, and/or a photograph. The current context may include a criterion that an interest of a first user of the ECD match with an interest of a second user of the partner ECD, as identified by the ECDs. The current context may also include a criterion that the first user of the ECD and the second user of the partner ECD are participants of a specified conference.

Then at 306, the electronic card program 110a, 110b determines whether the ECD is docked on a mobile device. According to one embodiment, a mobile device (e.g., smartphone 206) of the user may include a docking component or holder (e.g., holder 228) configured to receive the ECD for storage and portability. In one embodiment, the holder may include a third magnet which may interact with a second magnet of ECD, when the ECD is placed inside the holder (e.g., docked). The interaction between the third magnet of the holder and the second magnet of the ECD may activate the second switch device of the ECD to close a second circuit path configured to power on the ECD. In one embodiment, the electronic card program 110a, 110b may register a docked status or docked record in the memory of the ECD responsive to detecting the second switch device closing the second circuit path to power on the ECD. Accordingly, the electronic card program 110a, 110b may determine whether the ECD is docked with the mobile device by checking for the docked status in the memory of the ECD. In another embodiment, the electronic card program 110a, 110b may implement NFC or any other proximity-based communication mechanisms (e.g., Bluetooth) to determine if the ECD is in sufficient proximity to the mobile device such that the ECD may be docked in the holder.

If the electronic card program 110a, 110b determines that the ECD is docked at 306, then at 312, information is exchanged with the mobile device, as will be further described below. However, if the electronic card program 110a, 110b determines that the ECD is not docked at 306, then at 308, power is disengaged in the ECD. According to one embodiment, the ECD may power off via loss of contact with the partner ECD. The electronic card program 110a, 110b may detect a deactivation of the first switch device configured to power off the first ECD, responsive to the second ECD being outside of the threshold proximity of the first ECD. In such embodiments, the first magnets of the respective ECDs may be unable to interact resulting in deactivation of the first switch device and opening or disruption of the first circuit path. In at least one embodiment, the EECD program 110a, 110b may execute a shutdown script for automatically powering off the ECD upon completion of a transaction with the partner ECD. According to one embodiment, before the ECD is powered off, the electronic card program 110a, 110b may store the received or accumulated data in the memory of the ECD until the ECD comes in contact with the mobile device (e.g., received in the holder). In one embodiment, the electronic card program 110a, 110b may also update the record in the memory of the ECD to reflect that the ECD is not docked with the mobile device (e.g., by recording not docked status).

In some instances, the ECD may connect with multiple other ECDs (e.g., multiple partner ECDs) for exchanging information before the ECD is docked to transfer the data to the mobile device. In such instances, the electronic card process 300 may return to 302 to engage power via the first reed device responsive to connecting to another ECD.

Then at 310, power is detected via a second switch device. When the ECD is inserted in the holder (e.g., docked), the second switch device (e.g., reed switch/relay or mechanical switch) included in the ECD may be engaged to power on the ECD, independent of the first switch device of the ECD. In one embodiment, the electronic card program 110a, 110b may detect the activation of a second switch device to power on the ECD. The second switch device may be activated responsive to the interaction between the third magnet of the holder and the second magnet of the ECD, as described previously with reference to FIG. 2. In one embodiment, the electronic card program 110a, 110b may detect the closing of the second circuit path responsive to the interaction between the third magnet of the holder and the second magnet of the ECD. In one embodiment, the electronic card program 110a, 110b may also register a docked status or docked record in a memory of the ECD responsive to detecting the activation of the second reed device to power on the ECD.

Next at 312, data is transferred to the mobile device. Once ECD is docked in the holder and powered on, the electronic card program 110a, 110b may initiate transferring data to the mobile device, if new information is available. In one embodiment, the data for transfer may include information accumulated in the ECD, for example, by receiving data from the partner ECD. In one embodiment, the electronic card program 110a, 110b executing on the microprocessor or microcontroller of the ECD may perform the transfer of data to the mobile device using NFC or other proximity-based communication mechanisms. In another aspect, a remote agent communicating with the microprocessor or microcontroller of the ECD may initiate the transfer of information to the mobile device.

Thereafter at 314, power is disengaged. Once and the data is transferred or uploaded to the mobile device, the electronic card program 110a, 110b may implement a shutdown script to automatically power off the ECD.

According to one embodiment, the ECD, while docked on the mobile device and turned off via software (e.g., shutdown script), may interact with other partner ECDs for exchanging data. In such embodiments, the electronic card process 300 may return to 302 to engage power via the first switch device responsive to connecting to another partner ECD.

In various embodiments, if the ECD is carried in the holder of the mobile device, the electronic card process may start at 312 where the ECD is powered on via activation of the second switch device, as previously described. This interacting is described further below with reference to FIG. 5.

Figure 4:
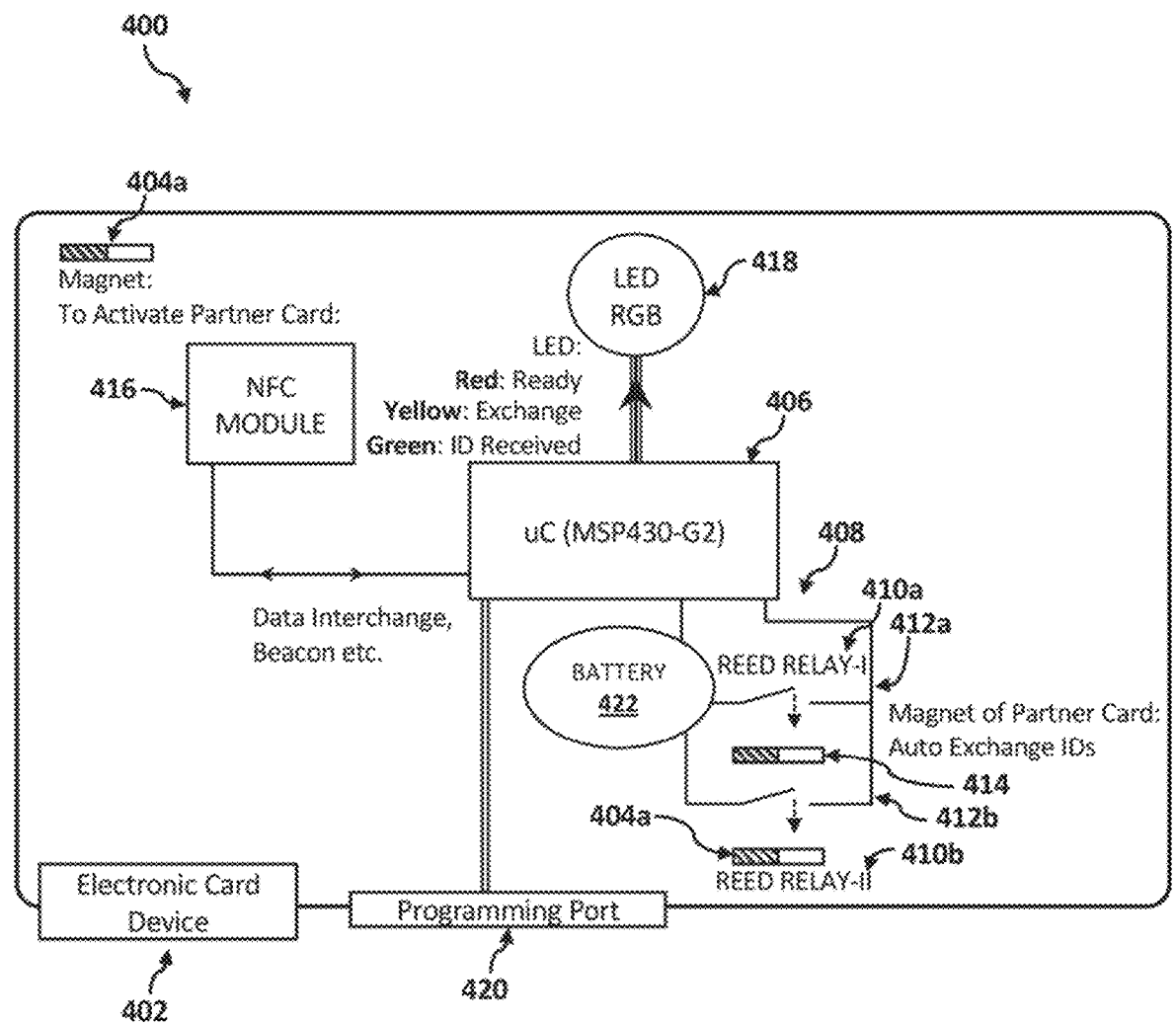
FIG. 4 is an electrical diagram of an exemplary electronic card device according to at least one embodiment.

Referring now to FIG. 4, an electrical diagram 400 of an exemplary electronic card device (ECD) 402 according to at least one embodiment is depicted. According to one embodiment, ECD 402 may be similar to the ECD 202 and partner ECD 204, as described previously with reference to FIG. 2.

According to one embodiment, ECD 402 may include a first magnet 404a, which may activate another such partner ECD and a second magnet 404b, which may interact with a third magnet of an ECD holder, as described with reference to FIG. 2. In one embodiment, ECD 402 may include a microcontroller 406, such as, for example, the depicted ultra-low-power microcontroller: MSP430-G2 (but not limited to such). In one embodiment, microcontroller 406 may be connected to a switch circuitry 408 including two switch devices (e.g., reed devices) connected in parallel. In one embodiment, a first reed relay 410a of the switch circuitry 408 may complete a first circuit path 412a and a second reed relay 410b of the switch circuitry 408 may complete a second circuit path 412b. In various embodiments, other switch devices (e.g., mechanical switches) are also contemplated, as previously described.

In one embodiment, the first reed relay 410a may be activated (e.g., switched on) responsive to a first magnet 414 of another ECD being in proximity of the ECD 402. Similarly, the first reed relay 410a may be deactivated (e.g., switched off) when the first magnet 414 of the another ECD is not nearby. In one embodiment, the second reed relay 410b may be activated (e.g., switched on) responsive to the second magnet 404b of the ECD 402 interacting with the third magnet of the ECD holder (not shown). As previously described, activating the second reed relay 410b may automatically trigger sending or exchanging data with the mobile device. Although not specifically depicted, in various embodiments, the ECD 402 may also include a push button which may be manually triggered to send or exchange data with the mobile device.

In at least one embodiment, the microcontroller 406 may also be coupled with an NFC module 416, which may allow the ECD 402 to communicate with another device, such as, for example, another partner ECD and/or the mobile device. Although not specifically depicted, in various embodiments, the ECD 402 may also include a Wi-Fi module and other wireless communication modules, such as, for example, a Bluetooth module for performing proximity-based communications with another device.

In various embodiments, the ECD 402 may include an LED component 418. In one embodiment, the LED 418 may light up in different shades based on different functions being performed in the ECD 402. For instance, the LED 418 may light up in red to indicate that the device is ready, the LED 418 may light up in yellow to indicate that information is being shared or exchanged with another device, and the LED 418 may light up in green to indicate that an identification has been received. Other light shade coding may be also be utilized. Although not specifically depicted, in various embodiments, the ECD 402 may also include a vibration component. In one embodiment, the vibration component may vibrate to indicate different functions or modes of the ECD 402. For instance, responsive to initiating a negotiation to share or exchange information, the vibration component may vibrate and may cease vibrating after a failed negotiation or after the exchange of information is completed.

According to one embodiment, the ECD 402 may also include a programming port 420 which may enable for programming of the microcontroller 406. In one embodiment, the programming port 420 may enable the ECD 402 to be programmed with the electronic card program 110a, 110b. In one embodiment, the electronic card program 110a, 110b running on the microcontroller 406 may enable the microcontroller 406 to function as an energy efficient agent, which may provide data to another device (e.g., partner ECD), receive data from another device (e.g., partner ECD), and/or exchange data with another device (e.g., partner ECD) in a manner configured to conserve the energy of a battery 422 provided to power the ECD 402. The energy efficient agent may also function to upload the data accumulated from other devices to another device such as a mobile device (e.g., smartphone, tablet, laptop) and/or another computer system in a manner configured to conserve the energy of the battery 422.

Figure 5:
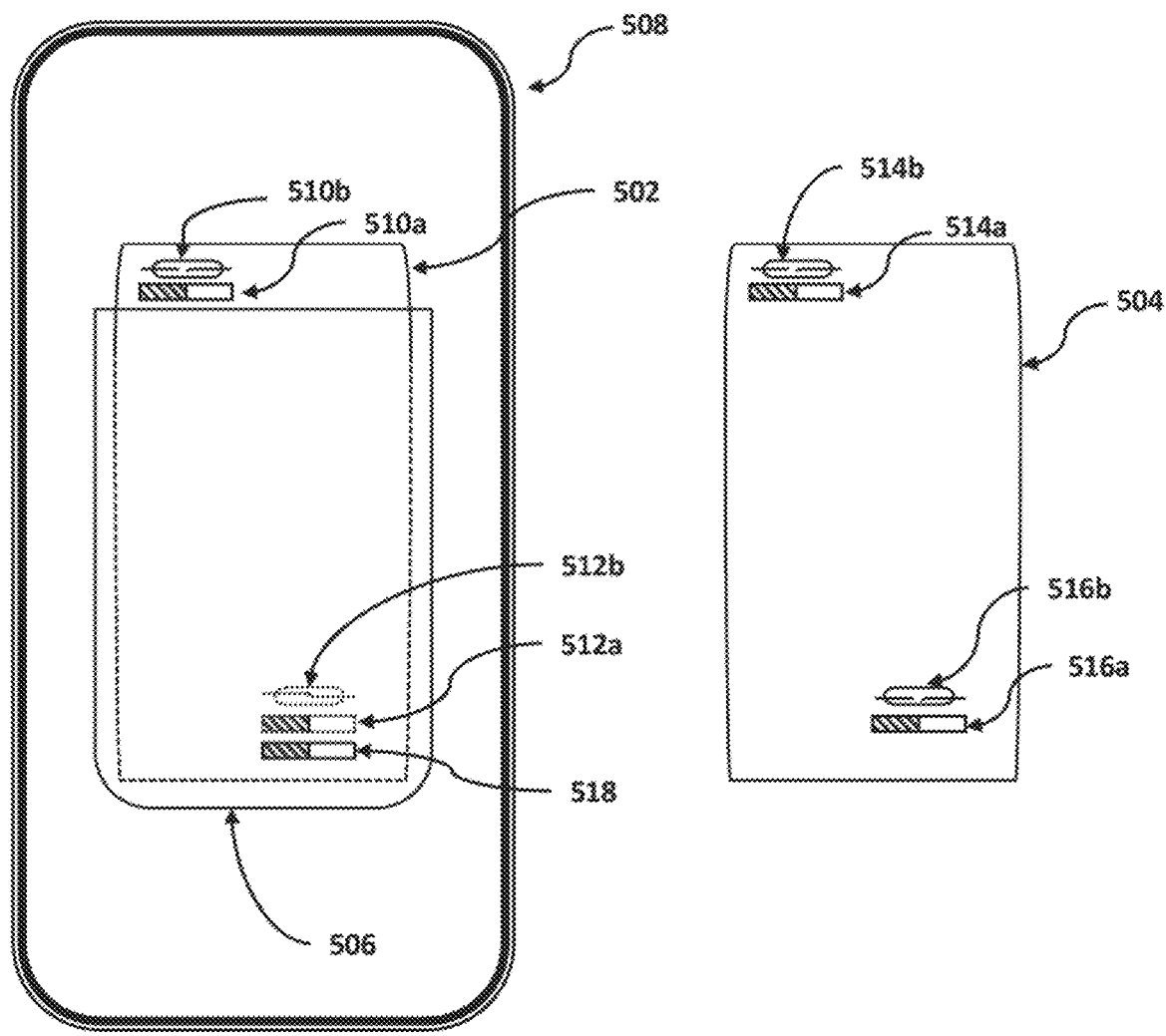
FIG. 5 is a block diagram illustrating an exemplary electronic card interaction according to at least one embodiment.

Referring now to FIG. 5, a block diagram 500 illustrating an exemplary electronic card interaction between a first ECD 502 and a second ECD 504 according to at least one embodiment is depicted. According to one embodiment, the first and second ECDs 502, 504 may be similar to the ECDs 202, 204, as described previously with reference to FIG. 2.

In one embodiment as depicted in FIG. 5, the first ECD 502 may be located in a holder 506 (e.g., docking component) attached to a mobile device 508. In one embodiment, the mobile device 508 may include a smartphone. In other embodiments, the mobile device 508 may include other user devices, such as, for example, a tablet or a laptop. The first ECD 502 may include two magnets (first magnet 510a and second magnet 512a) and two switch devices (first reed device 510b and second reed device 512b). In one embodiment, the two magnets and two reed devices may be arranged in magnet-reed pairs, where the first magnet 510a and first reed device 510b may provide a first magnet-reed pair and the second magnet 512a and the second reed device 512b may provide a second magnet-reed pair. According to one embodiment, the holder 506 may include a third magnet 518 configured to engage the second magnet 512a of the first ECD 502.

According to one embodiment, the first magnet-reed pair may be provided or disposed on a first end portion of the respective ECDs 502, 504 and the second magnet-reed pair may be provided or disposed on a second end portion of the respective ECDs 502, 504, opposite the first end portion, as shown in FIG. 5, such that the ECD 502 may simultaneously interact with the third magnet 518 of the holder 506 and the first magnet-reed pair (e.g., 514a, 514b) of the partner ECD 504.

According to one embodiment, the electronic card program 110a, 110b running on the first ECD 502 may determine that the first ECD 502 is docked in the holder 506 based on detecting the activation of the second reed device 512b (to power on the ECD) responsive to interactions between the second magnet 512a of the ECD 502 and the third magnet 518 of the holder 506. Upon inferring the presence of the first ECD 502 in the holder 506, the electronic card program 110a, 110b may register a docked status or record in the memory of the first ECD 502. Then, the electronic card program 110a, 110b may transfer any new data stored in the first ECD 502 to the mobile device 508 via NFC or any other proximity-based communication mechanism. Upon transfer of the information to the mobile device 508, the first ECD 502 may be automatically powered off via a shutdown script implemented by the electronic card program 110a, 110b.

Thereafter, the first ECD 502, while docked in the holder 506 of the mobile device 508 and powered off via software, may interact with the second ECD 504 for exchanging data.

In one embodiment, the first magnet-reed pair (e.g., first magnet 510a, first reed device 510b) of first ECD 502 may engage the first magnet-reed pair (e.g., first magnet 514a, first reed device 514b) of the second ECD 504 such that interactions between the first magnet 510a of the first ECD 502 and the first magnet 514a of the second ECD 504 may actuate the first reed devices 510b, 514b of the ECDs 502, 504, respectively. Accordingly, the first magnets 510a, 514a on the respective ECDs 502, 504 may activate the accompanying reed devices 510b, 514b to close a first circuit path and turn on the respective ECDs 502, 504.

In one embodiment, the electronic card program 110a, 110b executing on the microprocessor of the first ECD 502 may negotiate the exchanging of data with the second ECD 504 based on a current context, as previously described with reference to FIG. 2. Once the exchange of data between the ECDs is completed, the electronic card program 110a, 110b may determine that the first ECD 502 is docked with the mobile device 508 based on the recorded docked status in the memory of the first ECD 502. Responsive to determining the docked status, the electronic card program 110a, 110b executing on the first ECD 502 may perform the transfer of the received data to the mobile device 508 using NFC or other proximity-based communication mechanisms. Thereafter, the first ECD 502 may again be automatically powered off via the shutdown script implemented by the electronic card program 110a, 110b.

The functionality of a computer may be improved by the electronic card program 110a, 110b because the electronic card program 110a, 110b may enable a computer to minimize the energy requirements of a portable ECD configured to exchange data with other electronic devices. The electronic card program 110a, 110b may enable a computer to determine that another electronic device may be in wireless communication range by detecting the manner in which the ECD is powered on (e.g., first reed device or second reed device), instead of relying on proximity-based communication mechanisms which may consume more energy. The electronic card program 110a, 110b may also enable a computer to automatically power off the ECD upon completion of the needed data exchange transactions.

It may be appreciated that FIGS. 2 to 5 provide only an illustration of one embodiment and do not imply any limitations with regard to how different embodiments may be implemented. Many modifications to the depicted embodiment(s) may be made based on design and implementation requirements.

Figure 6:
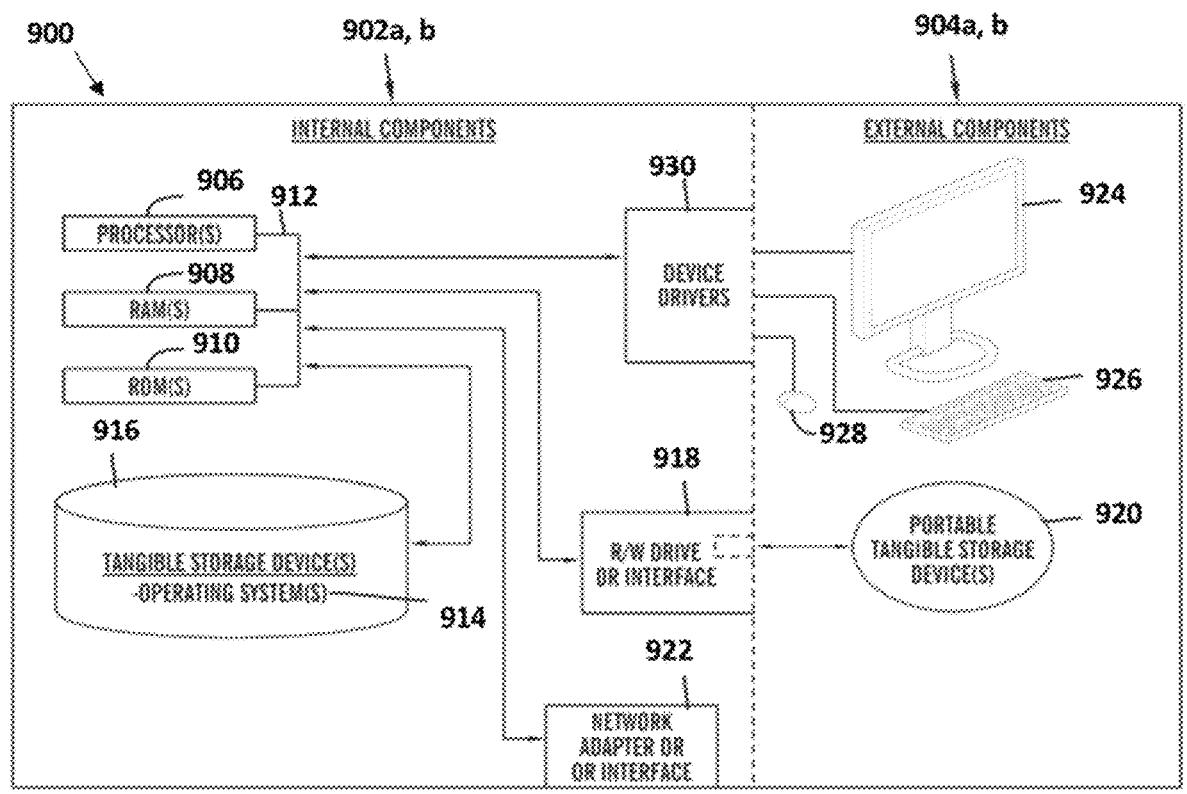
FIG. 6 is a block diagram of internal and external components of computers and servers depicted in FIG. 1 according to at least one embodiment.

FIG. 6 is a block diagram 900 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 6. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the electronic card program 110a in client computer 102, and the electronic card program 110b in network server 112, may be stored on one or more computer-readable tangible storage devices 916 for execution by one or more processors 906 via one or more RAMs 908 (which typically include cache memory). In the embodiment illustrated in FIG. 6, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the electronic card program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the electronic card program 110a in client computer 102 and the electronic card program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the electronic card program 110a in client computer 102 and the electronic card program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
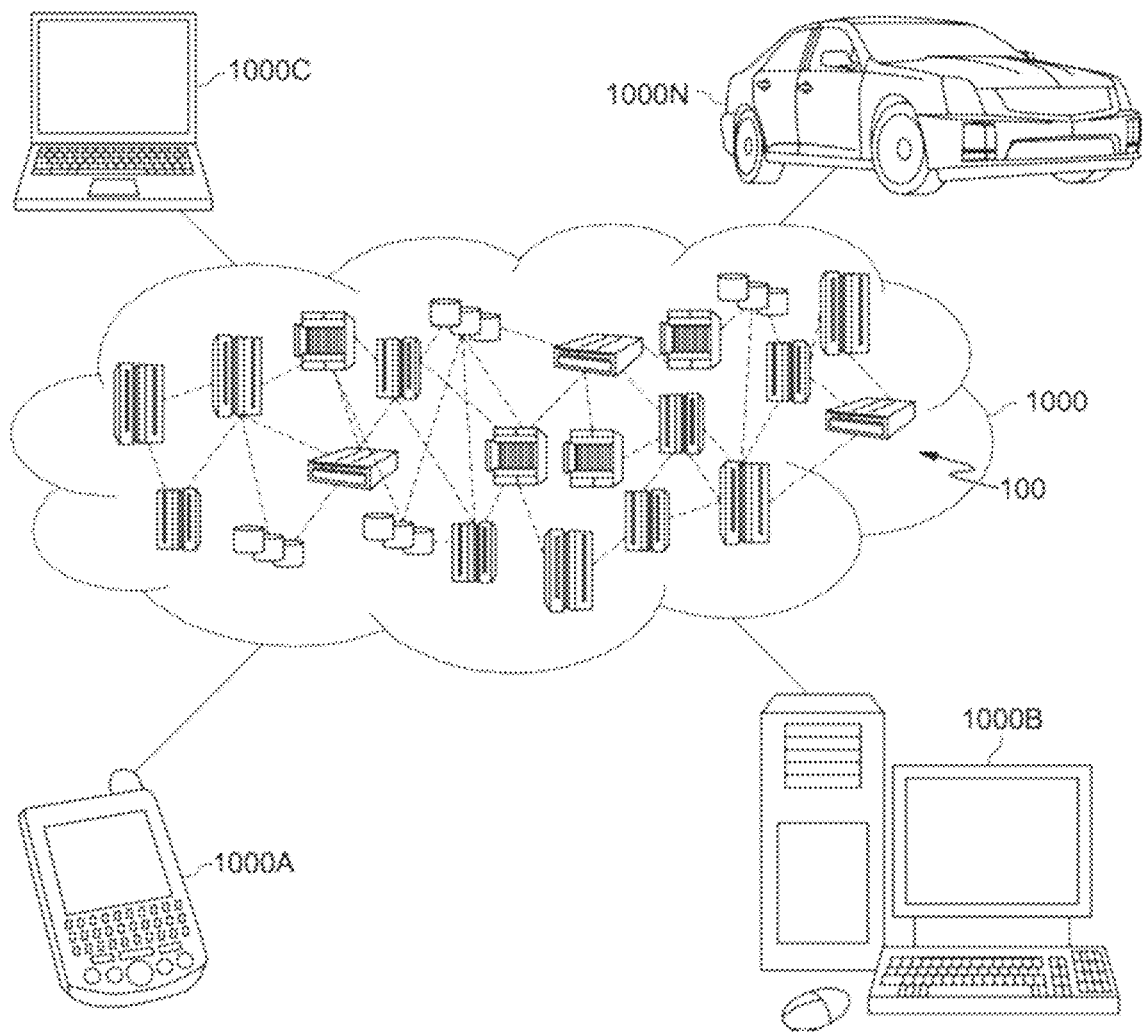
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
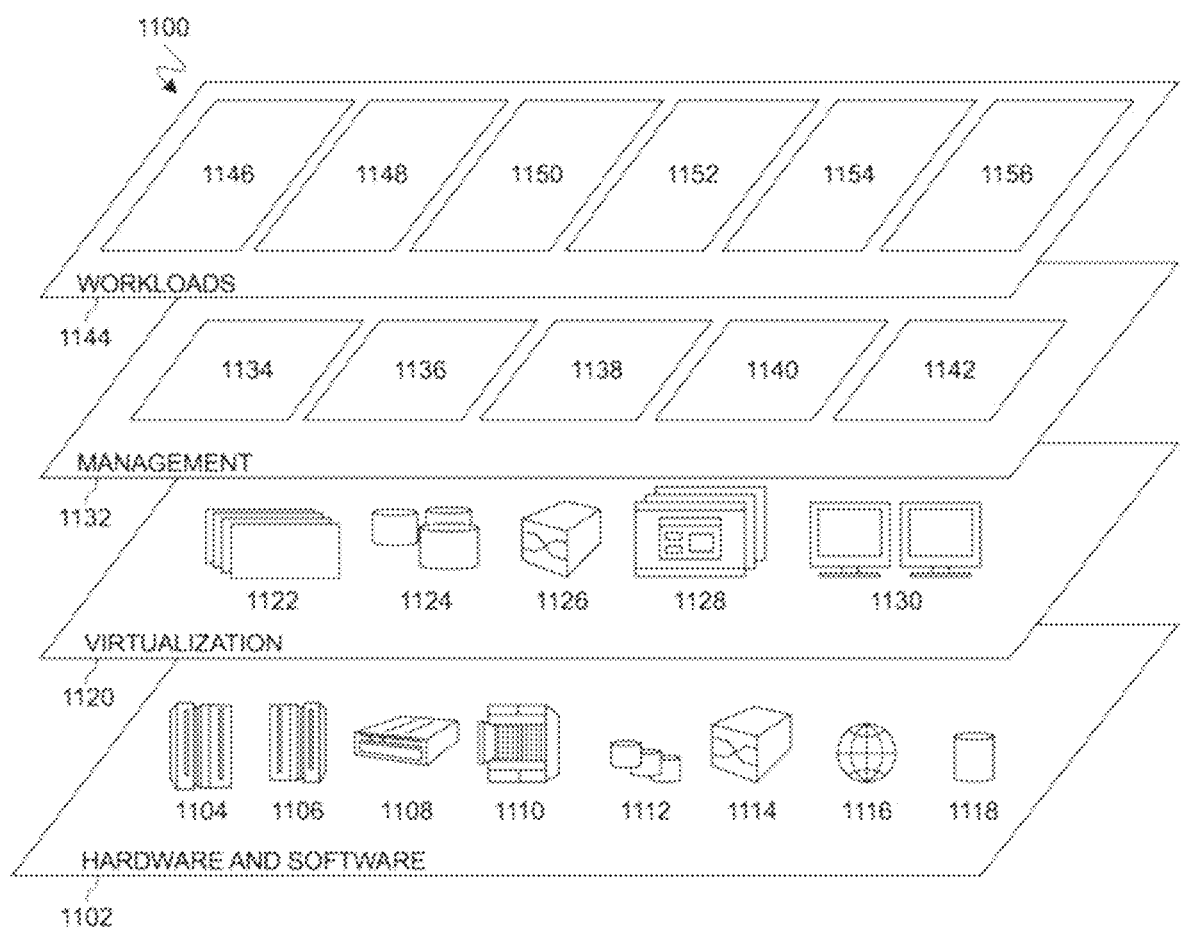
FIG. 8 is a block diagram of functional layers of the illustrative cloud computing environment of FIG. 7, in accordance with an embodiment of the present disclosure.

Referring now to FIG. 8, a set of functional abstraction layers 1100 provided by cloud computing environment 1000 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and energy efficient data exchange 1156. An electronic card program 110a, 110b provides a way to exchange information using a portable, energy efficient electronic device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for energy efficient data exchange, comprising:
   a first electronic card device (ECD) including a first circuit path having a first switch and a second circuit path having a second switch, wherein the first switch is configured to close the first circuit path to power on the first ECD independent of the second switch, in response to the first switch of the first ECD engaging a second ECD, wherein the first ECD is configured to exchange data with the second ECD; and
   a docking component configured to receive the first ECD, the docking component including an actuator configured to engage the second switch and close the second circuit path, without engaging the first switch, to power on the first ECD responsive to the first ECD being received by the docking component, wherein the first ECD is configured to transfer received data from the second ECD to a mobile device associated with the docking component.

2. The system of claim 1, wherein the first ECD further comprises a first magnet-switch pair associated with the first switch and a second magnet-switch pair associated with the second switch, and wherein the first switch and the second switch are arranged in parallel.

3. The system of claim 1, wherein the first ECD further comprises a first magnet associated with the first switch and a second magnet associated with the second switch, and wherein the actuator of the docking component further comprises a third magnet configured to interact with the second magnet to activate the second switch when the first ECD is received by the docking component.

4. The system of claim 1, wherein the first switch of the first ECD further comprises a first mechanical switch, the second switch of the first ECD further comprises a second mechanical switch, and the actuator of the docking component further comprises a third mechanical switch, wherein interaction between the first mechanical switch of the first ECD and a corresponding first mechanical switch of the second ECD is configured to power on the first ECD and interaction between the second mechanical switch of the first ECD and the third mechanical switch of the docking component is configured to power on the first ECD.

5. The system of claim 2 wherein the first switch of the first ECD further comprises a first reed switch and the second switch of the first ECD further comprises a second reed switch.

6. The system of claim 1, wherein the first switch of the first ECD is configured to engage a corresponding first switch of the second ECD to power on the first ECD and enable exchanging data with the second ECD, and wherein the first switch of the first ECD is configured to disengage from the corresponding first switch of the second ECD to power off the first ECD.

7. The system of claim 1, wherein the first ECD is configured to be received by the docking component and powered off by executing a shutdown script, and wherein the first switch pair of the first ECD is configured to engage a corresponding first switch of the second ECD to power on the first ECD and enable exchanging data with the second ECD.

8. The system of claim 1, wherein the docking component further comprises a holder configured to be coupled to the mobile device, the holder including the actuator configured to engage the second switch of the first ECD when the first ECD is located in the holder.

9. The system of claim 1, wherein:
the first circuit path is configured to close to power on the first ECD responsive to interactions between the first switch of the first ECD and a corresponding first switch of the second ECD.

10. The system of claim 1, wherein:
the second circuit path is configured to close to power on the first ECD responsive to interactions between the first switch of the first ECD and the actuator of the docking component.

11. The system of claim 1, wherein the first ECD further comprises a memory component, wherein the first ECD is configured to store a docked record in the memory component when the second switch of the first ECD is activated, and wherein the first ECD is configured to check the memory component for the docked record to determine whether the first ECD is received by the docking component.

12. The system of claim 3, wherein the first ECD is configured to transfer the received data from the second ECD to the mobile device responsive to the third magnet of the docking component and the second magnet of the first ECD engaging the second switch to power on the first ECD.

13. The system of claim 3, wherein the first magnet and the first switch are disposed on a first end portion of the first ECD and the second magnet and the second switch are disposed on a second end portion of the first ECD, opposite the first end portion, wherein the first ECD is configured to simultaneously interact with the second ECD and be received by the docking component.

14. The system of claim 12, wherein the first ECD is configured to execute a shutdown script to automatically power off the first ECD when the transfer of the received data to the mobile device is completed.

15. A computer-implemented method, comprising:
detecting, in a first electronic card device (ECD) including a first circuit path having a first switch and a second circuit path having a second switch, an activation of the first switch to close the first circuit path to power on the first ECD by a second ECD, wherein the activation of the first switch is independent of the second switch;
in response to the detected activation of the first switch, determining that the second ECD is within a threshold proximity of the first ECD;
exchanging data with the second ECD;
in response to determining that the first ECD is docked with a mobile device based on detecting an engagement of the second switch to close the second circuit path without engagement of the first switch, transmitting an accumulated information from the first ECD to the mobile device;
in response to determining that the first ECD is not docked with the mobile device, storing the accumulated information in the first ECD; and
detecting a deactivation of the first switch to power off the first ECD, responsive to the second ECD being outside of the threshold proximity of the first ECD.

16. The method of claim 15, further comprising:
detecting, in the first ECD, the activation of a second switch to power on the first ECD;
in response to the detected activation of the second switch, determining that the first ECD is docked with the mobile device;
transmitting the accumulated information from the first ECD to the mobile device; and
executing a shutdown script to automatically power off the first ECD, responsive to completing the transmitting of the accumulated information to the mobile device.

17. The method of claim 15, wherein detecting the activation of the first switch to close the first circuit path to power on the first ECD further comprises:
detecting the first circuit path closing responsive to interactions between a first magnet of the first ECD and a corresponding first magnet of the second ECD.

18. The method of claim 16, further comprising:
recording a docked status in a memory of the first ECD, responsive to the detected activation of the second switch to power on the first ECD.

19. The method of claim 16, further comprising:
in response to receiving the at least one information from the second ECD, checking the memory of the first ECD to determine if the first ECD is docked with the mobile device; and
in response to identifying the recorded docked status in the memory of the first ECD, transmitting the received at least one information to the mobile device.

20. A computer program product for energy efficient data exchange, the computer program product comprising:
one or more non-transitory computer-readable storage medium and program instructions collectively stored on the one or more non-transitory computer-readable storage medium, the program instructions comprising:

program instructions to detect, in a first electronic card device (ECD) including a first circuit path having a first switch and a second circuit path having a second switch, an activation of the first switch to close the first circuit path to power on the first ECD by a second ECD, wherein the activation of the first switch is independent of the second switch;

program instructions to in response to the detected activation of the first switch, determine that the second ECD is within a threshold proximity of the first ECD;

program instructions to exchange at least one information with the second ECD;

program instructions to in response to determining that the first ECD is docked with a mobile device based on detecting an engagement of the second switch to close the second circuit path without engagement of the first switch, transmit an accumulated information from the first ECD to the mobile device;

program instructions to in response to determining that the first ECD is not docked with the mobile device, store the accumulated information in the first ECD; and program instructions to detect a deactivation of the first switch to power off the first ECD, responsive to the second ECD being outside of the threshold proximity of the first ECD.

* * * * *